United States Patent [19]
Cohen et al.

[11] Patent Number: 4,729,774
[45] Date of Patent: Mar. 8, 1988

[54] NONUNIFORM REGENERATION SYSTEM FOR DESICCANT BED

[75] Inventors: Barry M. Cohen, Newton Centre, Mass.; Robert K. Collier, Jr., Cove Creek, Ariz.; Andy H. Levine, Boston; Francis A. DiBella, Roslindale, both of Mass.

[73] Assignee: Gas Research Institute, Chicago, Ill.

[21] Appl. No.: 837,941

[22] Filed: Mar. 10, 1986

[51] Int. Cl.⁴ ............................................. B01D 53/06
[52] U.S. Cl. ....................................... 55/181; 55/208; 55/269; 55/390
[58] Field of Search ................. 55/31, 33, 34, 60, 62, 55/74, 75, 78, 181, 208, 269, 387–390

[56] References Cited

U.S. PATENT DOCUMENTS

| | | | |
|---|---|---|---|
| 1,912,784 | 6/1933 | Miller et al. | 55/390 X |
| 2,993,563 | 7/1961 | Munters et al. | 55/34 |
| 3,009,540 | 11/1961 | Munters | 55/34 |
| 3,251,402 | 5/1966 | Glav | 165/7 |
| 3,398,510 | 8/1968 | Pennington | 55/163 |
| 3,683,591 | 8/1972 | Glav | 55/34 |
| 3,708,956 | 1/1973 | Norbäck | 55/208 X |
| 3,774,374 | 11/1973 | Dufour et al. | 55/208 X |
| 3,828,528 | 8/1974 | Weil | 55/388 |
| 3,880,224 | 4/1975 | Weil | 165/2 |
| 3,889,742 | 6/1975 | Rush et al. | 55/390 X |
| 4,014,380 | 3/1977 | Rush et al. | 165/2 |
| 4,081,024 | 3/1978 | Rush et al. | 165/62 |
| 4,113,004 | 9/1978 | Rush et al. | 165/3 |
| 4,134,743 | 1/1979 | Macriss et al. | 55/34 |
| 4,180,126 | 12/1979 | Rush et al. | 165/59 |
| 4,269,611 | 5/1981 | Anderberg | 55/389 X |
| 4,343,355 | 8/1982 | Goloff et al. | 165/166 |
| 4,384,611 | 5/1983 | Fung | 165/166 |
| 4,391,616 | 7/1983 | Imamura | 55/390 X |
| 4,398,927 | 8/1983 | Asher et al. | 55/34 |
| 4,460,388 | 7/1984 | Fukami et al. | 55/387 X |
| 4,497,361 | 2/1985 | Hajicek | 55/390 X |
| 4,529,420 | 7/1985 | Norbäck | 55/390 X |
| 4,582,129 | 4/1986 | Yano et al. | 55/269 X |
| 4,594,860 | 6/1986 | Coellner et al. | 55/390 X |

FOREIGN PATENT DOCUMENTS

| | | | |
|---|---|---|---|
| 2729345 | 1/1978 | Fed. Rep. of Germany | 55/208 |
| 125177 | 9/1979 | Japan | 55/208 |
| 104626 | 8/1980 | Japan | 55/390 |
| 177119 | 10/1984 | Japan | 55/208 |

*Primary Examiner*—Robert Spitzer
*Attorney, Agent, or Firm*—Kenway & Crowley

[57] ABSTRACT

Profiling the temperatures in the regeneration airstream for a desiccant bed yields higher thermal efficiency. In staged regeneration, distinct heating elements are thermostatically controlled to attain progressively higher temperatures toward the hotter end of the bed. Stratified heat recovery can be used to transfer heat from process air from zones on the process side to regeneration airstreams headed for thermally corresponding zones on the regeneration side of the desiccant bed. A recirculation system diverts process air from the hottest process zone or zones directly to the hottest corresponding zone or zones on the regeneration side.

9 Claims, 26 Drawing Figures

FIG. 14A (a) SINGLE RECIRCULATION

FIG. 15A (b) MULTIPLE "STRATIFIED" RECIRCULATION

NONUNIFORM REGENERATION SYSTEM FOR DESICCANT BED

CROSS-REFERENCE TO RELATED APPLICATION

The subject matter of the present application is related to that of the abandoned application entitled "Nonhomogeneous Desiccant Bed for Dehumidifying or Cooling System", Ser. No. 837,850 filed Mar. 16, 1986 by Cohen et al, assigned to the assignee of the present application and incorporated herein by reference.

BACKGROUND OF THE INVENTION

The invention relates generally to environmental cooling systems based on regenerative desiccant dehumidifiers and more particularly to the means by which the desiccant is regenerated or restored.

Desiccant based cooling systems have been known for some time to have potential as heat-actuated space-cooling devices. Desiccant systems operate entirely on heat and mass transfer processes. An open cycle desiccant cooling system is essentially a hybrid of two fundamental air processors: a desiccant dehumidifier and an adiabatic evaporative cooler. In the simplest embodiment, outdoor ambient air passes through a drying wheel of hygroscopic material which absorbs or adsorbs moisture from the air, accompanied by heating of the air. The dried warmed air then flows through a heat exchanger, usually a second rotating wheel, where it is cooled by the transfer of sensible heat. The dried cooled air is then further cooled and reconstituted to a desired humidity by passing it through an evaporative humidifier. In the desiccant wheel, the dehumidification process converts the latent heat of water vapor to sensible heat by means of absorption or adsorption. Thus, the desiccant wheel is sometimes referred to as the L-wheel while the heat exchanger, if rotational, is referred to as the S-wheel, alluding to the transfer of sensible heat.

There are numerous ways to configure the layout of these various components, namely, the L-wheel, S-wheel and evaporators, in order to modify or improve performance characteristics. In all of the systems, however, one of the main features is the regeneration of the desiccant. Typically the L-wheel is divided into a process side and a regeneration side by means of diametrical and circumferential seals. Heated air is blown through the regeneration side to dry out the desiccant so that when it rotates into the process side, it is available again for sorption of water from ambient air.

Open cycle desiccant cooling systems based on natural adiabatic and heat transfer processes offer a set of characteristics which make them potentially more cost effective than vapor compression electric air conditioning systems in certain applications. For example, larger roof top installations represent an excellent application, particularly where ventilation of the building is also a requirement. Here, the lower energy consumption and lack of high pressure coolant lines and seals make desiccant cooling systems attractive, especially where added heat for regenerating the desiccant is provided by gas burners, gas costing much less than electricity in the summer.

As with any energy related product, however, one of the focal points for cost effectiveness is high performance component design. From a system standpoint the desiccant regeneration system is quite important in terms of increasing the overall efficiency or so called coefficient of performance ("COP"), (namely, the cooling capacity divided by the thermal energy input of the cooling system) without sacrificing the specific cooling capacity ("SCC") (BTU/lb$_{da}$). The rotating L wheel, divided in two by sliding diametrical stationary seals, exhibits a static angular temperature profile or gradient which is approximately symmetrical with respect to the plane of the partition between the process and regeneration sides. At any given moment of operation after equilibrium is reached, the wheel is hottest where it leaves the regeneration side and enters the process side and declines in temperature to the coolest region where it leaves the process side and enters the regeneration side. In general, in prior art systems, air on the regeneration side leaves the heat exchanger (S wheel) in a uniform, mixed stream and is relatively uniformly heated by the regeneration heater before passing through the desiccant wheel. The temperature of the regeneration air immediately prior to entering the desiccant wheel is approximately the same throughout the semi-circular area.

SUMMARY OF THE INVENTION

Accordingly, the general purpose of the invention is to improve the coefficient of performance (COP) without sacrificing the specific cooling capacity (SCC) in a desiccant-based cooling system by optimizing the regeneration system. Another object of the invention is to enhance the usage of recovered heat by optimizing the heat exchanger design.

These and other objects of the invention are achieved by tailoring the regeneration temperature profile at the entrance to the regeneration side of the desiccant wheel. A spatial distribution of temperatures in either the heater or the heat exchanger or both is matched to the pre-existing spatial temperature distribution across the surface on the regeneration side of the desiccant wheel. Two distinct methods of marrying the spatial temperature distribution in the regeneration stream with the temperature distribution in the wheel are: (1) staged or profiled regenerative heating and (2) stratified heat recovery. In staged regeneration, the heater is arranged to produce a temperature gradient on the regeneration side in either discrete steps or a continuously uniformly or nonuniformly varying temperature profile. In the discrete system, for example, unheated air from the heat exchanger may be passed directly to the first sector on the regeneration side, moderately heated air is passed to an intermediate sector and the most heated air is passed to the last sector before the process side.

In stratified heat recovery, the rotary S wheel of the prior art is replaced with a stationary heat exchanger with radial or rectilinear strata which associate the temperature zones of the process air out of the desiccant wheel with the corresponding temperature zones of the regeneration side. Thus, for example, the hottest process air is used to heat regeneration air headed for the hottest zone of the regeneration side of the L wheel. Both direct and indirect heat exchanger designs are disclosed, along with a novel method of manufacturing the direct stratified heat exchanger by folding flat stock accordion-fashion in an overall rectilinear shape, abutting aligned partitions to opposite ends and sealing alternate end faces of the resulting flat channels.

A further refinement can be achieved by a recirculation system which shunts the hottest process air from the first process zone or zones directly to the corresponding final zone or zones of the regeneration side after having elevated its temperature by heating. In one embodiment, multiple contiguous sectors on process and regeneration sides are coupled with different corresponding heat inputs.

DESCRIPTION OF THE PREFERRED EMBODIMENTS

The following description relates to three conceptually different designs for profiling the regeneration temperatures at the inlet to the regeneration side of the desiccant wheel. Desiccant wheels are useful by themselves as dehumidifiers and separators, or as components of a desiccant based cooling system. As the following embodiments are directed specifically to cooling systems, an understanding of the typical desiccant air conditioning system is helpful.

Numerous component configurations have been proposed for recirculating and ventilation mode systems in the past. Current investigation has focussed on ventilation mode systems of the type shown in FIGS. 1 and 2. Operating with humid outside air, these systems compare favorably to electric vapor compression systems where interior ventilation is also required so that credit is given for cooling from ambient temperatures.

Figure 1:
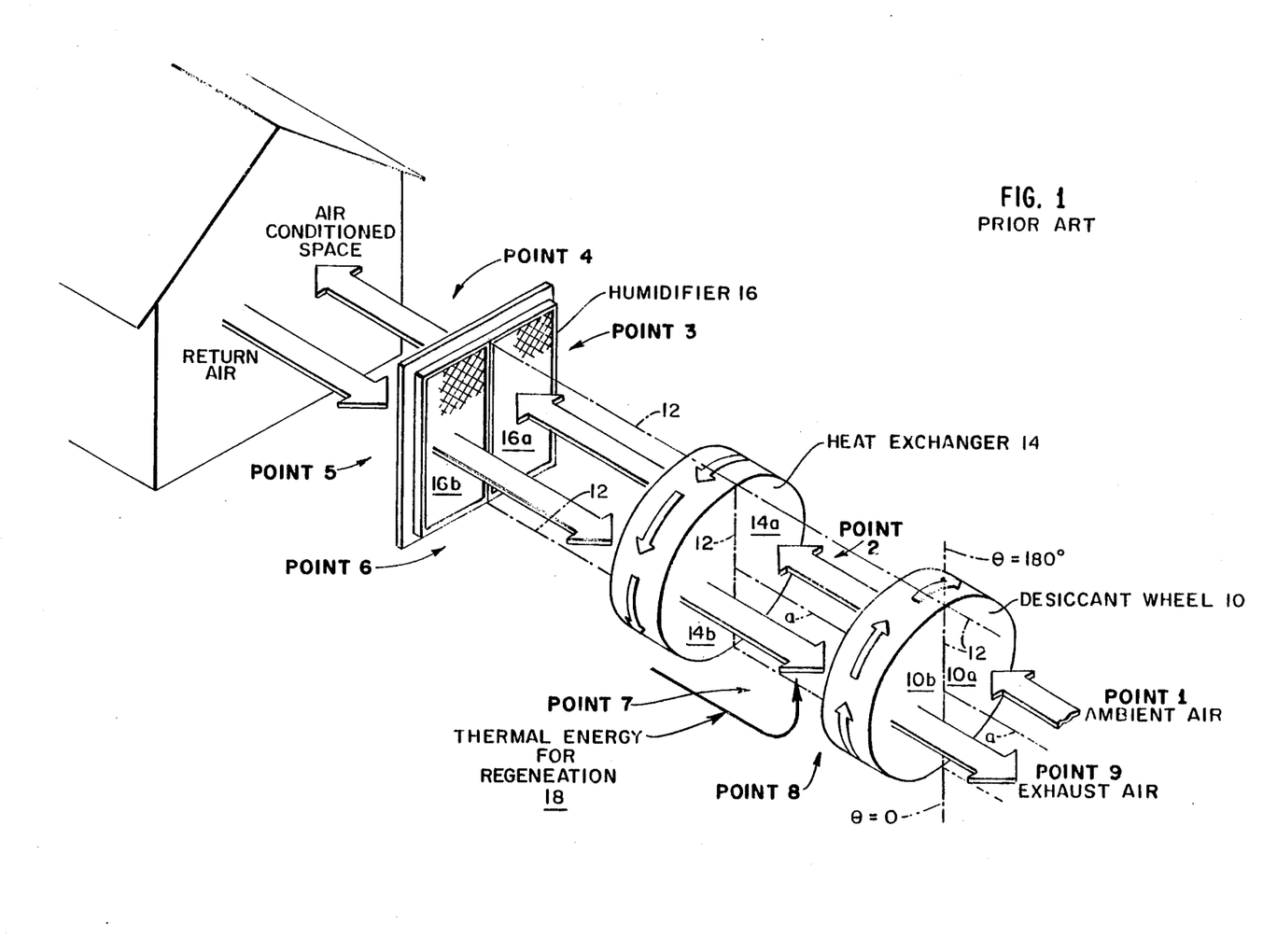
FIG. 1 is a functional, schematic, perspective view representing a typical open cycle desiccant air conditioning system.
Figure 2:
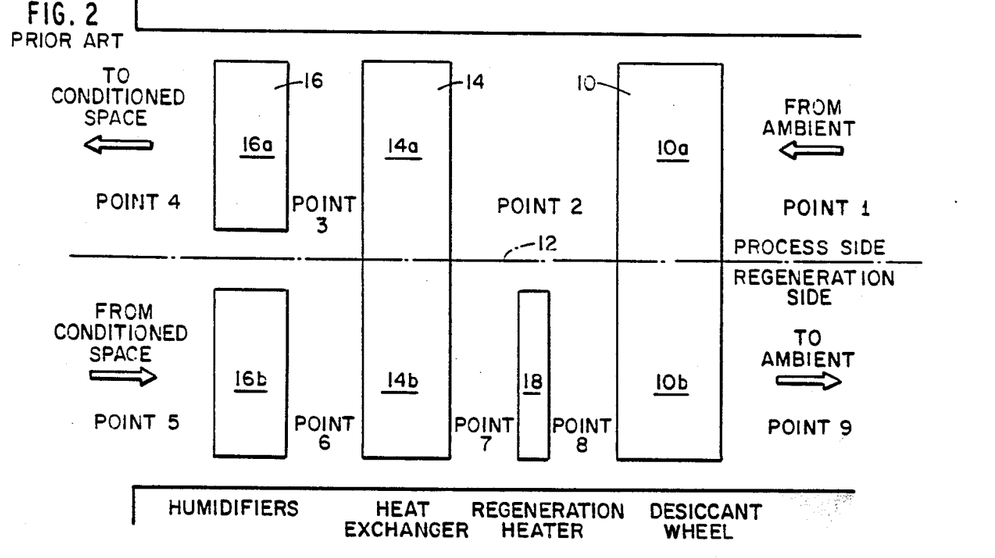
FIG. 2 is a schematic plan diagram of the layout of the components of the system of FIG. 1.

A desiccant wheel 10 is mounted for rotation on axis a. A stationary partition 12 (shown as vertical in FIG. 1), running from one end of the system to the other with diametrical and circumferential seals where necessary, divides the exposed face of the desiccant wheel 10 into two semi-circular areas. The right-hand area 10a of the wheel 10 as viewed in FIG. 1 defines the entrance to the so-called process side of the system. The left-hand side 10b of the face of the desiccant wheel as viewed in FIG. 1 defines the exit point of the so-called regeneration side of the system. A heat exchanger or S-wheel 14 is coaxially spaced from the desiccant wheel, the sliding seal vertical partition 12 again defining corresponding process and regeneration sides 14a and 14b of the heat exchanger 14. Typically the S-wheel and L-wheel rotate in opposite directions. On the other side of the heat exchanger 14, air is forced through a humidifer 16 having water-laden evaporator media 16a and 16b lying respectively in the process and regeneration sides of the system. A heater 18 lies in the regeneration side between the heat exchanger 14 and the desiccant wheel 10 as shown in FIG. 2. Electric motor driven low velocity fans or blowers (not shown) are typically utilized to cause air to move through the desiccant wheel to the humidifier on the process side and in the opposite direction from the humidifier to the desiccant wheel on the regeneration side as indicated by the arrows in FIGS. 1 and 2.

In operation, hot moist outdoor air is drawn into the exposed process side face 10a of the desiccant wheel 10 at point No. 1. Passing through the desiccant wheel, the air is dehumidified by condensation accomplished by adsorption of the water vapor in microporous materials such as silica gel or molecular sieves or by absorption of the water vapor forming inorganic salt hydrates or salt solutions, using chemicals such as lithium chloride. As disclosed in the above-referenced copending application, nonhomogeneous desiccants can also be employed.

Besides drying the air, condensation also heats the air by releasing the latent heat of the water vapor as sensible heat. At point 2, the dry air, now hotter than the ambient air, encounters the heat exchanger 14, a heat capacity structure of aluminum, for example which transfers a portion of the heat in the air at point 2 to the regeneration side of the system. Leaving the heat exchanger 14 at a lower temperature and still dry, the air next encounters the evaporator 16a at point 3. Taking on water vapor absorbs heat from the air stream thus resulting in cooler humidified air at point 4 entering the conditioned space or room to be cooled.

On the regeneration side, return air from the room (point 5) is drawn through evaporator 16b where it is cooled and further humidified before being passed at point 6 to the heat exchanger 14. Heat released by dehumidification on the process side is transferred to the air stream on the regeneration side so that return air exiting the heat exchanger 14 at point 7 is warmer than the return air at point 6. However, the air at point 7 is not yet hot enough to drive the moisture out of the desiccant wheel 10. Accordingly, thermal energy is added by heater 18. The hot relatively dry air at point 8 passes through the regeneration side 10b of the desiccant wheel 10, dries out the desiccant by absorbing water, and exits at point 9 as warm humid air which is exhausted to the atmosphere.

The desiccant wheel 10 is a moisture exchanger whose sole function is to dry the ambient air. The above-referenced copending application describes a nonhomogeneous desiccant bed design in which a rotary L wheel is divided into two or more axial layers with corresponding desiccants or mixtures of desiccants arranged in order of decreasing optimal operating range of humidity and increasing optimal operating temperature range in the direction of process air flow. The present application is compatible with the nonhomogeneous desiccant bed approach.

Figure 14:
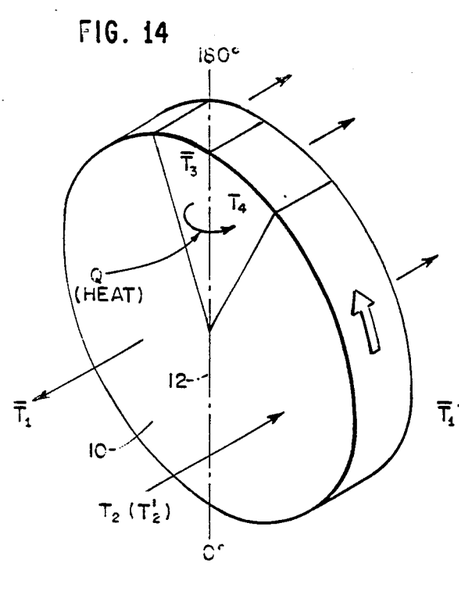
FIGS. 14 and 15 are schematic perspective views of desiccant wheels equipped, respectively, with single sector and double sector shunts for recirculation regeneration between the process and regeneration sides according to the invention.
Figure 15:
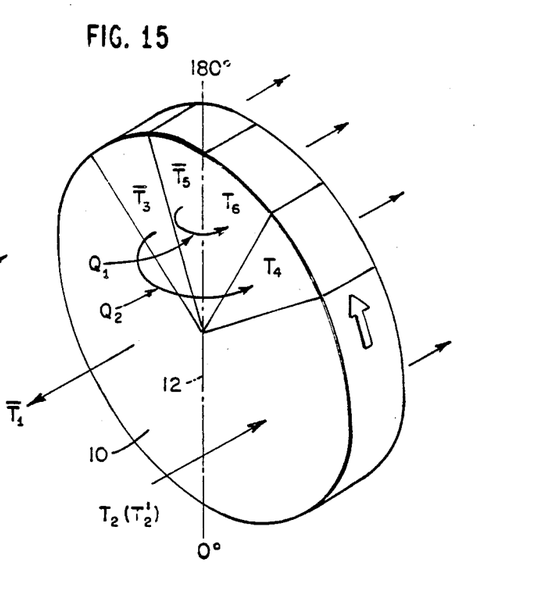

The specific point of departure of the present application is in the regeneration side upstream of the desiccant wheel 10 and involves either the regeneration heater 18 or heat exchanger 14 (or both) in an attempt to match the temperature profile of the regeneration airstream at points 7 and/or 8 with the spatial distribution of temperatures in the regeneration half of the wheel 10b as shown in FIG. 2. Two conceptually different approaches called staged regeneration and stratified heat recovery are shown in FIGS. 1–8 and 9–12, respectively. The recirculation system shown in FIGS. 14 and 15 illustrates another form of stratified heat recovery without using a heat exchanger. Recirculation regeneration is also compatible with staged regeneration.

Constant regeneration temperatures with low heat capacity desiccant beds can easily supply too much regeneration energy. The passage of heated air through a cool substance medium creates a wave-like effect wherein the medium is heated more deeply with time. The thermal wave or regeneration temperature wave can propagate to almost complete breakthrough of the bed. The result is an average outlet air temperature during regeneration significantly higher than desired for high efficiency. The thermal wave can and should be delayed or retarded by gradually increasing regeneration temperature with time (staging), rather than holding it constant over the entire regeneration period. This strategy shows important increases in the COP with little accompanying reduction in SCC.

The following embodiments show different ways of raising COP by profiling the temperature of the regeneration air stream. In all of them the objective is to slow down the regeneration wave so that it does not break through the bed. The lower the heat capacity of the wheel, the steeper the waves will be and therefore the easier it will be to confine them within the bed by the use of nonuniform regeneration practices.

Figure 3:
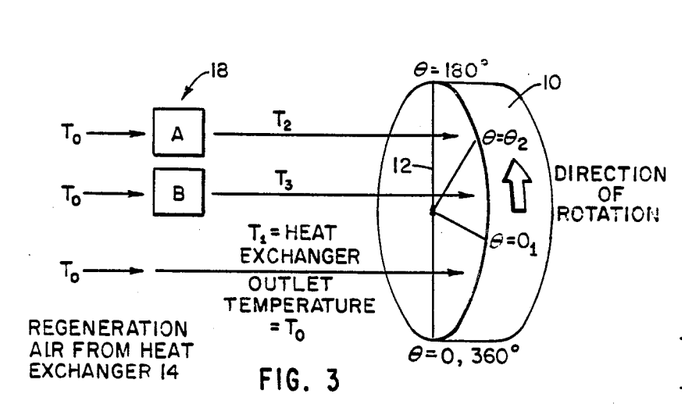
FIG. 3 is a schematic diagram illustrating staged regeneration in discrete steps.
Figure 3A:
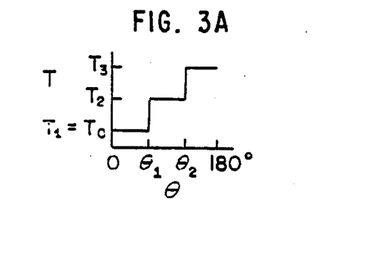
FIG. 3A is a graph of temperature versus angle illustrating the different regeneration temperatures.

As shown in FIG. 3, the face of the desiccant wheel facing the regeneration heater and heat exchanger is partitioned into two semicircles, the regeneration side being designated 0° to 180° and the process side being designated 180° to 360°. Rotating counterclockwise as viewed in FIG. 3 (in the same direction as increasing angle), the hot end of the wheel will be at 180° and the cool end of the wheel will be at 0°. FIGS. 3 and 3A show a stepwise increase in the regeneration stream temperature from 0° to 180°. The first stage of heating is accomplished by using only heat exchanger effluent which is at a temperature higher than the bed initially due to the averaging of the temperatures out of the process side in the heat exchanger 14 (FIG. 2). Subsequently, air is heated to progressively higher temperatures in stages by heating elements A and B as shown in FIG. 3. If $T_0$ is the outlet temperature of the heat exchanger, the first heat level $T_1$ will be approximately equal to $T_0$ as indicated in FIGS. 3 and 3A for the first sector in the regeneration side. The middle sector in the regeneration side receives an air stream heated to temperature $T_2$ by heating element B. The final sector of the regeneration side receives a stream heated to temperature $T_3$ by heating element A. The temperatures have the relationship $T_3 > T_2 > T_1 = T_0$.

A hydronic heater with two coils may be useful in providing the heating elements A and B of FIG. 3. Alternatively, heat pipe heating systems may be used and may be more economical than hydronic heating systems. Heat pipe heating systems are recommended for markets that do not require a yearly cycle of heating since the heat pipe system does not readily permit the desiccant cooling system to perform in a space heating mode.

Figure 4:
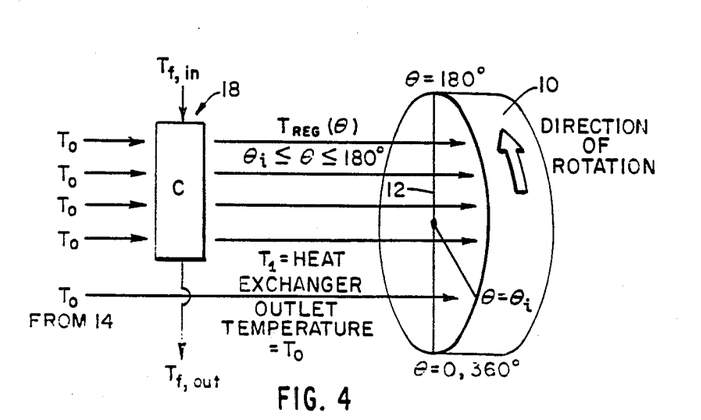
FIG. 4 is a diagram illustrating staged regeneration with continuously variable temperature.
Figure 5:
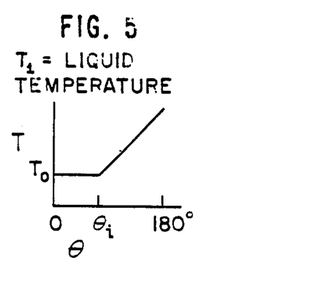
FIG. 5 is a graph of temperature versus angle illustrating the temperature variation in the design of FIG. 4.

FIGS. 4 and 5 illustrate the alternate embodiment of staged regeneration in which the temperature nonuniformity is established in a continuous fashion using a heat exchanger designated C carrying a moving fluid which has a low enough total heat capacity that it varies its temperature with angular displacement as heat is extracted thus varying the temperature to which the varying points in the regeneration air stream are heated. As in the discrete staged regenerator of FIG. 3, the first sector receives effluent from the heat exchanger 14 directly. The term $T_{f,in}$ represents the temperature of the heating fluid entering the heat exchanger C while $T_{f,out}$ represents the temperature of the cooled fluid at the outlet of the heat exchanger C.

Figure 6:
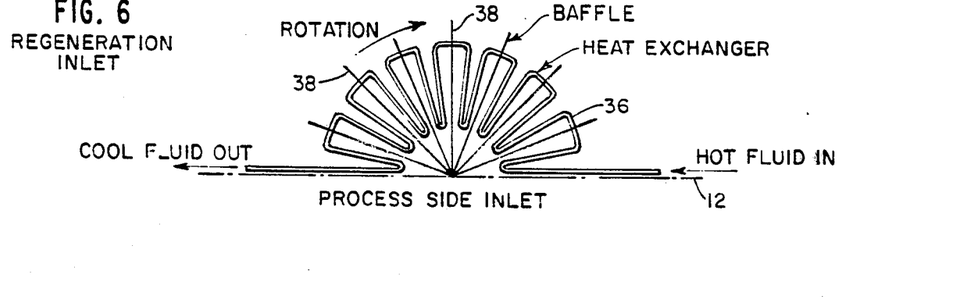
FIG. 6 is a diagrammatic plan view of a heating coil system for achieving nonuniform temperature distribution in the regeneration heater.
Figure 7:
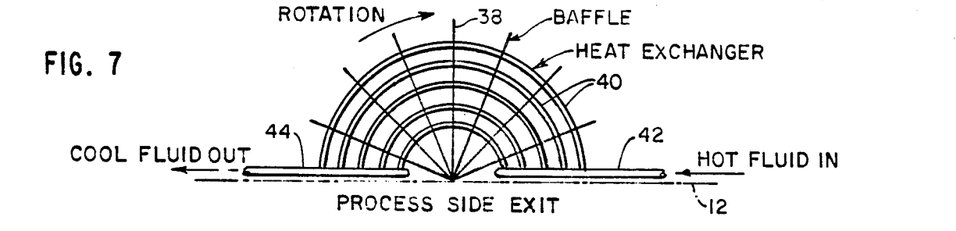
FIG. 7 is a diagrammatic plan view of another embodiment of the continuously varying profiled temperature regeneration heater having a uniform distribution.
Figure 8:
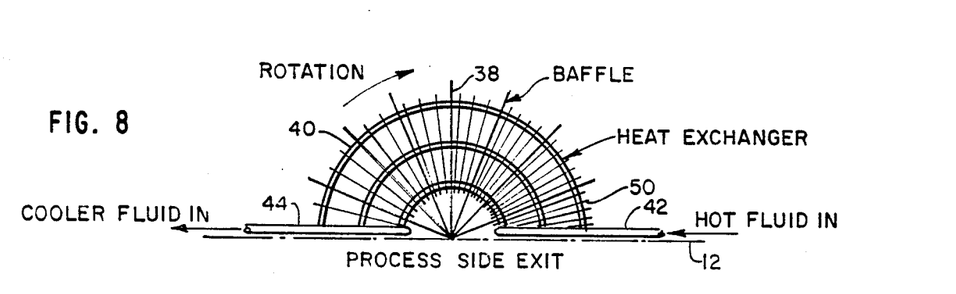
FIG. 8 is a diagrammatic plan view of another embodiment of the continuously variable profiled temperature regeneration heater having a circumferentially, nonuniformly distributed heat exchanger.

The fan-shaped heating structures of FIGS. 6, 7 and 8 represent alternate means of achieving continuously variable temperatures in the regeneration stream. As shown in FIG. 6, a heated fluid is carried through a serpentine, fan-shaped, heat exchanger tube 36 which is intersected by equally spaced radial baffles 38. In FIG. 7, instead of a single serpentine fluid path, a plurality of approximately concentric semicircular tubes 40 are connected between aligned inlet and outlet manifolds 42 and 44 connected to a hydronic boiler system, for example. The concentric heat exchanger tubes 40 intersect equally spaced radial baffles 38 as in FIG. 6.

The systems of FIGS. 6 and 7 depend on fluid temperature variation to control the temperature to which the air stream is heated. The system of FIG. 8, however, has the same baffles 38 and concentric fluid paths 40 but uses a nonuniform distribution of heat exchanger elements such as fins 50 to nonuniformly transfer heat to the air stream. In the embodiment of FIG. 8 with nonuniform heat exchangers distributed over the 0° to 180° arc, the surface area of the heat exchanger in each sector governs the amount of heat transferred to the stream and thus the temperature of the stream in a given sector. In FIG. 8, ideally the fluid velocity through the lines 40 is high so that the temperature drop from inlet to outlet manifold 42 and 44 is not as influential as the heat transfer surface area variation as a function of angle. In contrast, the fluid temperature controlled embodiments of FIGS. 6 and 7 may require significantly lower flow rates to achieve the desired temperature gradient. Other patterns and sizes of heat exchanger components for the embodiments of FIGS. 6, 7 and 8 can be tailored to attain desired temperature profiles.

Figure 9:
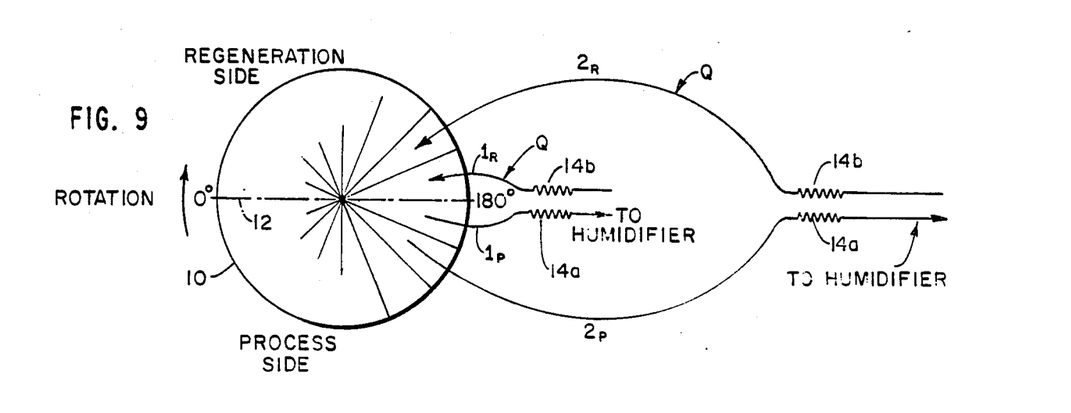
FIG. 9 is a schematic diagram illustrating the concept of stratified heat recovery for profiling the regeneration temperatures.

FIGS. 9–12 illustrate stratified heat recovery. This system seeks to establish a nonuniform regeneration stream before encountering the heater 18. It is typical for the process air to exit from the desiccant wheel 10 with a nonuniform outlet temperature which is hot initially and progressively cooler as rotation angle increases from 180° to 360°. On the other hand, it has been shown that the regeneration side, which sees the coolest desiccant first, would prefer to use lower temperature heating first, increasing the temperature as a function of angular displacement from 0° to 180°. FIG. 9 illustrates the techniques of correlating, by heat exchange, points on the process side with points on the regeneration side. That is, strata are created by baffles or other means which provide section to section heat exchange rather than having the process stream transfer heat to the regeneration stream in bulk, the mixing being inherently thermodynamically inefficient. Thus, as shown in FIG. 9, stream $1_P$ from the first sector of the process side, a hot stratum, transfers heat with sector $1_R$, a point on the regeneration side preferring hot air. This stratified heat exchange continues around the wheel. For each stratum, a small amount of heat is added (Q in FIG. 9) since regeneration must occur at a temperature slightly higher than process.

Figure 9A:
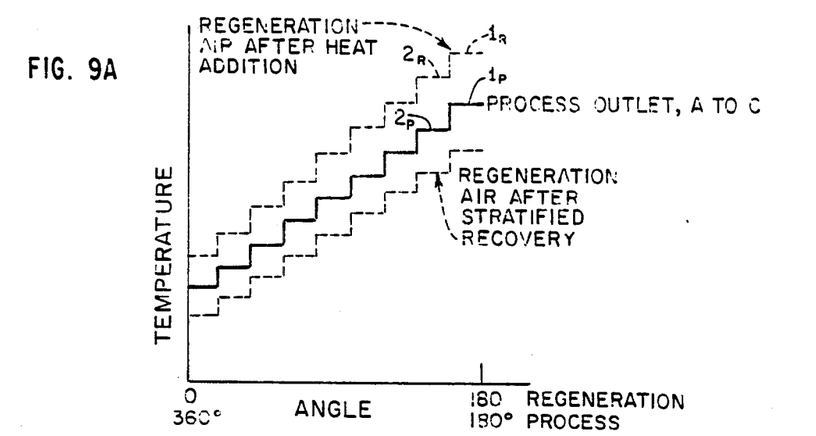
FIG. 9A is a graph of temperature versus angle illustrating the temperature profile yielded by the design of FIG. 9.

FIG. 9A shows the resulting temperature profile which exhibits a staircase pattern of graduated temperatures as desired.

The effect of the stratified heat recovery system is to return temperatures in a shape similar to the mirror image of the natural process outlet profile, thereby first heating the bed with air only slightly higher than the minimum process outlet temperature. By reflecting the outlet temperature profile on the process side to the regeneration side, thereby preserving both high and low ranges of temperature, with the appropriate cycle time, a thermodynamically superior situation results. The goal of optimization is achieved in that low process humidities are generated while rejecting a minimum amount of heat to the ambient. Properly scheduled regeneration retards breakthrough by allowing only an amount of heat to be added to the bed sufficient to cause regeneration of the desiccant.

Figure 10:
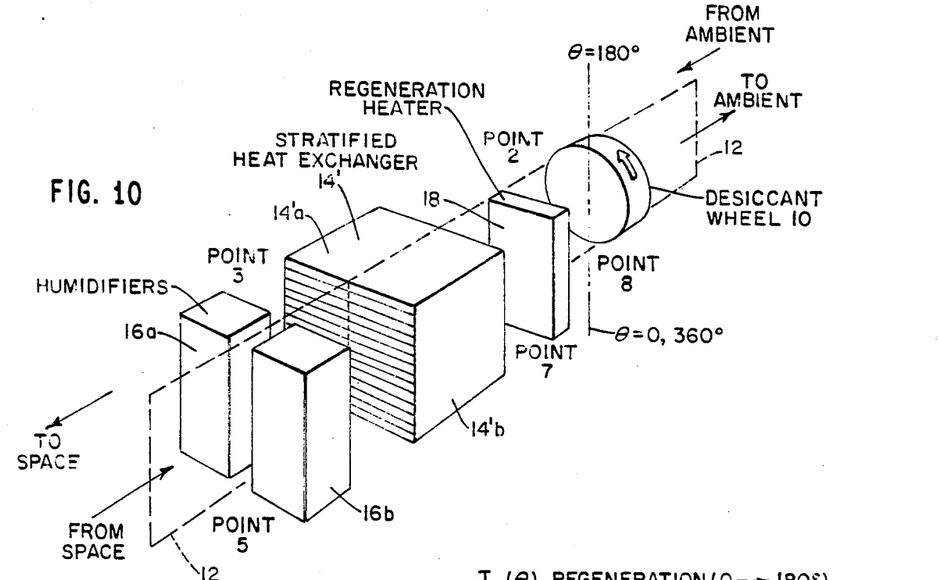
FIG. 10 is a schematic perspective view of a desiccant based cooling system having a stratified heat exchanger according to the invention.
Figure 10A:
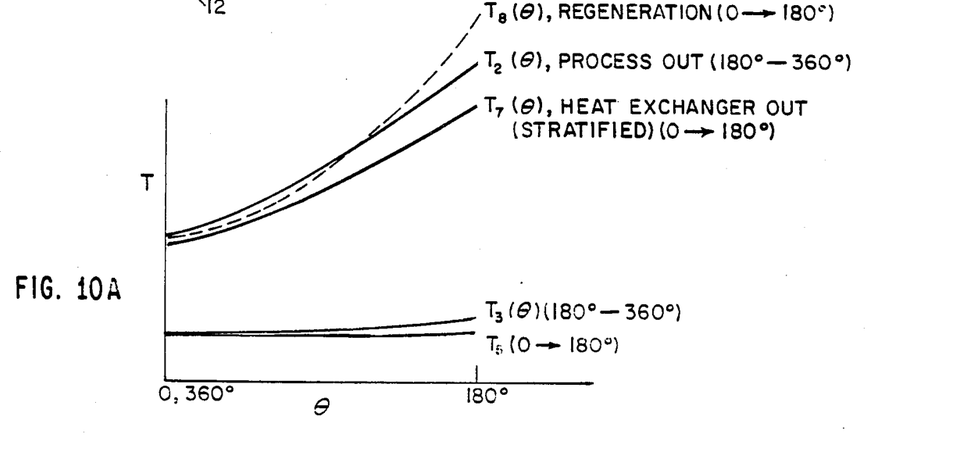
FIG. 10A is a graph of temperature versus angle illustrating temperature profiles at the indicated points with respect to the system of FIG. 10.
Figure 11A:
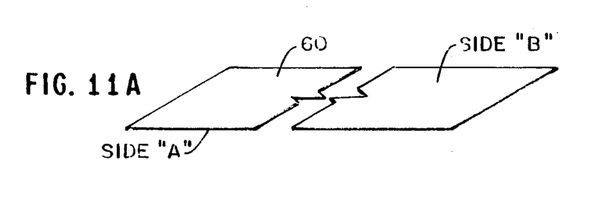
FIGS. 11A-F are schematic perspective views illustrating four consecutive steps, respectively, in the construction of a preferred form of stratified heat exchanger.
Figure 11B:
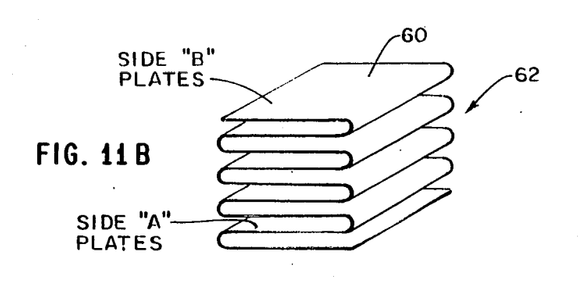
Figure 11C:
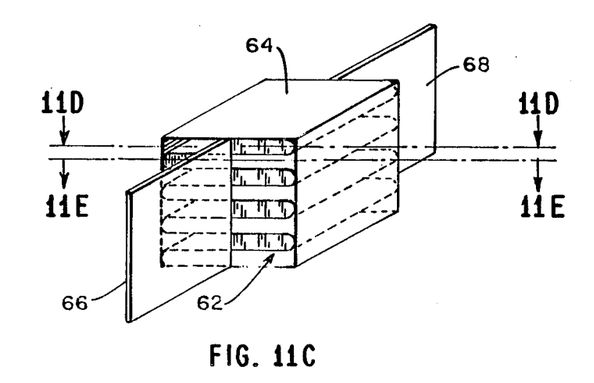
Figure 11D:
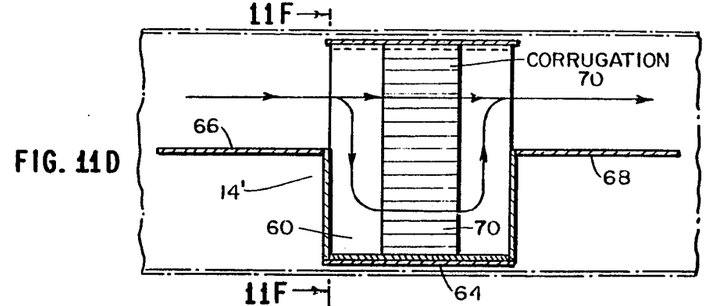

A stratified heat exchanger 14' suitable for stratified heat recovery is shown in FIG. 10 and a specific embodiment is shown in FIG. 11D. In this design, ductwork (not shown) would take the radial geometry at the process outlet into a rectilinear air-to-air channel-type heat exchanger whereby no crossover between channels would be permitted, thereby retaining stratification. Essentially, each stratum of air goes through its own individual heat exchanger as shown schematically in FIG. 9.

A plate core heat exchanger accomplishing stratified heat recovery is shown in FIG. 11D. FIGS. 11A through C show the four-step construction process. In the first step a flat, elongated sheet stock 60 of construction material, preferably aluminum, is cut to the desired length and width. In step 2, as shown in FIG. 11B, the flat stock 60 is repeatedly folded in an accordion fashion to form alternate plates of side A and side B. In FIG. 11C the pleated structure 62 is placed inside a hollow, rectangular duct or box 64 so that a series of parallel, flat channels are defined. Next, sealing partitions 66 and 68 are aligned with opposite ends of the open channel work. Partitions 66 and 68 are part of the partition system 12 shown in FIG. 10. Note that the partitions 66 and 68 do not extend into the box 64 but form static seals along opposite open end faces of the box. The end faces of alternate channels are sealed as shown in FIG. 11C so that there can be no communication between the regeneration and process sides other than heat transfer through the flat stock 60. Addition of an internal, corrugated (or pleated) structure 70 (FIG. 11F) to the core makes additional heat transfer area available. This internal structure also provides the needed structural support to prevent the walls of the plates from collapsing under positive and negative blower pressure. The result is a compact, inexpensive, pure counterflow, direct-type, stationary static seal heat exchanger with high calculated effectiveness.

Figure 12:
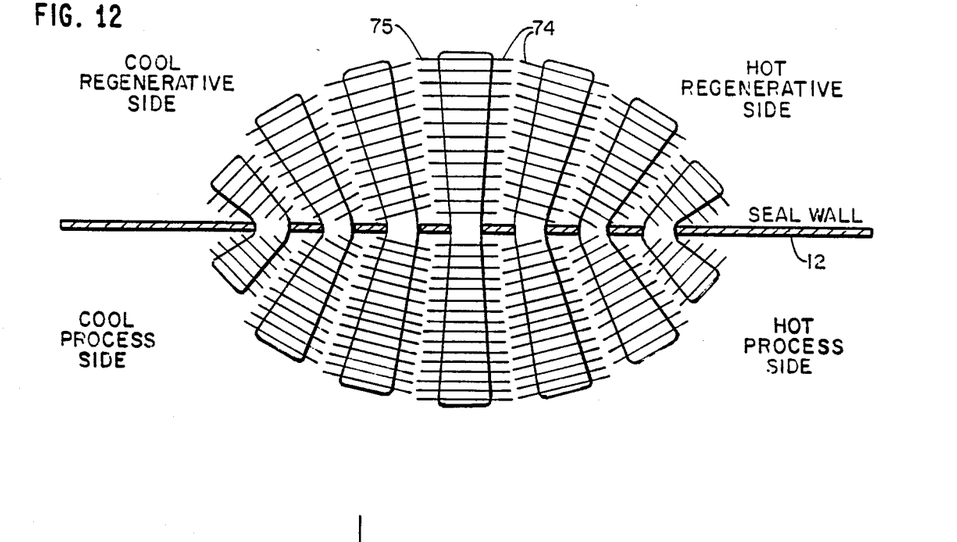
FIG. 12 is a schematic plan view of an indirect heat exchanger composed of heat pipes bent in a radial design to associate corresponding temperature zones according to the invention.

As shown in FIG. 12, closed heat pipes 74 can be used to transfer heat indirectly between strata. One way of accomplishing this is to bend the heat pipes to form approximately radial pipe sections as shown. The diameter of each pipe or the size of its fins 75 may increase with distance from the seal 12 to help keep the temperature of each zone uniform with distance from the seal in each sector. The result is a spatial correlation of corresponding temperature zones on the process and regeneration sides of the desiccant wheel. Another system (not shown) is to duct the strata from the process outlet of the desiccant wheel through a transition from a radial to a rectilinear heat pipe arrangement. A nearly constant heat rate could be applied while maintaining the same mirror image stratification.

A fixed heat exchanger such as that shown in FIGS. 10, 11C and 12 overcomes the seal problem with rotary heat exchangers. The use of heat pipes in particular has an advantage over static heat exchanger structures like that shown in FIG. 11C since heat pipes provide good conductivity of heat over extended distances with good thermal contact and transfer properties due to mass transfer by boiling and condensation in the heat pipes. A subset of this concept is to use multiple arrays in the flow direction (not shown) to increase the efficiency.

Figure 13A:
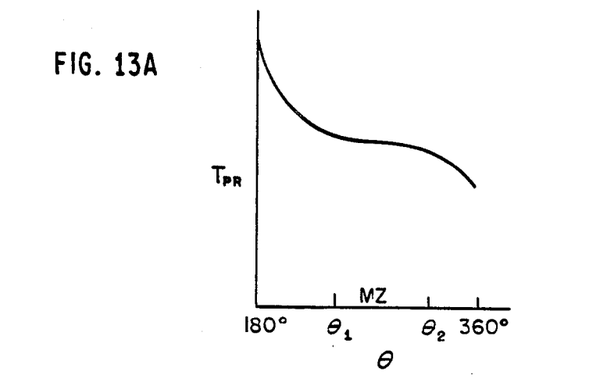
FIGS. 13A and 13B are graphs of typical temperature and humidity versus angle at the proces outlet.
Figure 13B:
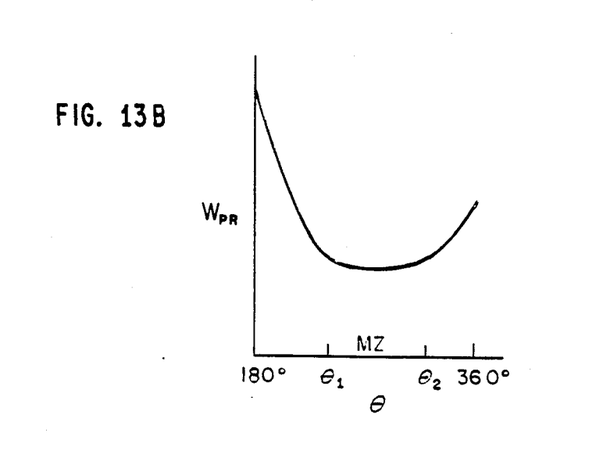

As shown in FIGS. 13A and 13B the process outlet temperature and humidity profiles from the desiccant wheel, i.e., the thermodynamic states of the air with respect to the displacement angle, are nonuniform. Air which is best for cooling or dehumidification is produced in the middle zone ("MZ"). From 180° to the angle $\theta_1$, i.e., the first process sector, the air is typically hot and humid. The sector of the wheel that has just exited the regeneration stream is at a high temperature and has a high equilibrium vapor pressure since it still has not cooled sufficiently to allow adsorption. The air coming out of this sector will therefore be hot and wet, thus reducing the average specific capacity of the air and the overall capacity of the unit. This air can be rejected. It is useless as a product of the cycle either in a cooling device or in a dehumidifier. It does, however, contain a significant energy availability which could be used to regenerate the desiccant, a process requiring hot air. If any of its useful energy content can be recovered, it reduces the regeneration energy input while increasing the cooling capacity of the unit.

As shown in FIG. 14, a single recirculation loop can be used to shunt process air from the first, hottest process sector to the last, hottest sector of the regeneration side. A small boost in temperature level (Q) may be all that is needed. A further refinement uses multiple recirculation loops to couple a plurality of corresponding sectors in the hotter zones of the desiccant wheel. Slightly higher heat $Q_1$ is added to the top adjacent sectors and relatively lower heat $Q_2$ is added to the next adjacent corresponding sectors as shown in FIG. 15. The result is stratified recirculation wherein air of different temperatures is provided in different sectors of the regeneration side of the desiccant wheel. Adjusting the cycle time or bed heat capacity can change the outlet profile to make it more favorable for this technique. Use of this recirculation system is seen to benefit designs with large heat capacities more than designs with small heat capacities. This is because the thermal wave is steeper for the latter designs, resulting in a shorter, useful recirculation period. If the recirculation period is shorter, the effect of recirculation on the performance of the wheel will, of course, be lower.

As an additional possibility the main regeneration stream temperature $T_2$ in FIG. 14 can be raised to $T_2'$ to assist in low temperature reqeneration. $T_2'$ can also be a function of angle as in stated regeneration shown in FIGS. 3 and 5.

The benefits of the recirculation regeneration system are manifested throughout the system. Since the recirculated flow does not pass through the entire system, the volume of air moving through the entire system is reduced, resulting in reduction of the size of all components including, for example, lower fan power. In a standard ventilation cycle desiccant cooling system like that shown in FIGS. 1, 2 and 10, the heat exchanger operates typically with laminar flow and requires a certain effectiveness. It is sized to handle the full air flow even though some of the air is useless or may even have a negative effect. Thus the heat exchanger 14 and humidifiers 16 may be reduced in size to handle only the net useful flow if the hot sectors are short circuited to the regeneration side.

Recovery of the highest temperature heat available in the cycle is beneficial to the COP and the stratified or multiple recirculation design is akin to stratified heat recovery as shown in FIGS. 9-12, but is more efficient, suffering no heat exchange loss. The hottest process air, although humid compared to other process air, is dry or at best equivalent when compared to the regeneration air which is humidified room air. Thus, the recirculation streams can do an effective job of regeneration if they are only slightly heated. The recirculation regeneration system is also compatible with either staged regeneration or stratified heat recovery heat exchangers.

The advantages of the invention, many of which have already been pointed out in the foregoing description, are numerous. By tailoring the temperature profile of the regeneration air stream, the invention controls the thermal wave through the desiccant so that a minimum amount of heat is rejected to the ambient. The symmetry in the temperature profile matches hot with hot and cool with cool for optimum heat transfer over a relatively small uniform difference in temperature, unlike prior systems which expose hot and cool sectors alike to the same temperature regeneration air stream. Because the regeneration profiling system transfers heat more efficiently, it lessens the dependency of the system on the design of the heat exchanger, while at the same time retaining a low mass desiccant wheel. Thus, smaller wheels can be used with less pressure drop, lowering the blower requirements.

The foregoing description of preferred embodiments is intended to be illustrative and not restrictive. Many variations are possible without departing from the spirit and scope of the invention. For example, nonhomogeneous beds composed of layered distinct desiccants as in the copending application can yield improved COP. Staged regeneration and stratified heat recovery are compatible with high performance multi-desiccant beds. The stratified heat exchanger design offers the advantage of recovering heat while preserving an image of the temperature profile on the process side which can be amplified in its entirety by uniform or staged heating to feed back a compatible profile of temperatures to the regeneration side.

A further option exists to close the loop on the regeneration temperature profile by using temperature sensors to monitor the outlet temperature distribution on the regeneration side of the wheel and then use this data to control the set points of a multistage regeneration heater to optimize the parallel profile of the regeneration air stream temperatures. The opportunity exists, on a dynamic basis, to control regeneration temperature in response to a changing load and/or changing ambient conditions. This would provide more efficient operation on long-term basis, e.g., over a period having seasonal changes.

While the embodiments have been described in reference to rotary desiccant wheels, the invention is also applicable in an analogous manner to reciprocating and traveling belt desiccant designs. In a reciprocating pair of desiccant beds, the periodicity corresponds to time rather than angles of displacement, thus the temperature profile would be staged time-wise rather than spatially distributed.

The scope of the invention is indicated by the appended claims and equivalents thereto.

What is claimed is:

1. In a regeneration system for a desiccant bed having at least one desiccant bed divided into a process side and a regeneration side, means for flowing process air through said process side of said bed, and means for flowing regeneration air through said regeneration side of said bed, the improvement comprising means for spatially profiling the temperature of the regeneration air nonuniformly over the surface area of the regeneration side of said bed, said profiling means including stationary heat exchanger means for transferring heat between corresponding zones in the process and regeneration side.

2. The system of claim 1, wherein said corresponding zones are parallel, rectilinear strata.

3. In a desiccant-based regeneration system having at least one desiccant bed having a process side which includes a first hottest sector and a regeneration side which utilizes a last hottest sector, means for flowing process air through the process side of said bed, and means for flowing regeneration air through the regeneration side of said bed, the improvement comprising
    means for diverting the process air flowing out of said first hottest sector of the process side of said desiccant directly to said last hottest sector of the regeneration side of said bed as regeneration air, and
    means for heating said diverted process air during its passage from said process side to said regeneration side.

4. The system of claim 3, wherein said diverting means includes means for diverting process air from a plurality of zones of said process side to corresponding zones of said regeneration side to provide regeneration air.

5. The system of claim 4, wherein said process side zones are contiguous zones of declining temperature, respectively, and said regeneration side zones are corresponding contiguous zones of declining temperature, respectively.

6. The system of claim 3 further including means for spatially profiling the temperature of at least a portion of said regeneration air.

7. In a regeneration system for a desiccant bed having desiccant wheel means for providing a desiccant bed, a partition for dividing said bed into a process side and a regeneration side, means for imparting relative rotation between said wheel means and said partition, means for flowing process air through said process side of said bed to produce a process outlet stream, the improvement comprising:

stationary heat exchanger means having a process side inlet for receiving said process outlet stream and a regeneration side outlet,     means for flowing regeneration air to the regeneration side of said bed via said regeneration side of said stratified heat exchanger means,     said heat exchanger means including strata means for associating regions of said process side with thermally corresponding regions on said regeneration side of said bed, and     regeneration heating means interposed between said regeneration side outlet of said heat exchanger means and the regeneration side of said bed for heating the regeneration airstream.

8. The system of claim 7, wherein said stratified heat exchanger means includes means defining a plurality of corresponding parallel rectilinear strata on process and regeneration sides.

9. The system of claim 7, wherein said stratified heat exchanger means includes a plurality of stationary heat pipes bent in a radial configuration conforming approximately to corresponding isotherms of the regeneration and process sides of said bed.

* * * * *

UNITED STATES PATENT AND TRADEMARK OFFICE
CERTIFICATE OF CORRECTION

PATENT NO. : 4,729,774
DATED : March 8, 1988
INVENTOR(S) : Barry M. Cohen, Robert K. Collier, Jr., Andy H. Levine, Francis A. DiBella It is certified that error appears in the above-identified patent and that said Letters Patent are hereby corrected as shown below:

Claim 7, column 11, line 19, after "stationary" insert --stratified--.

<u>In the Drawings:</u>

Sheet 2, Fig. 3, reverse the positions of the reference characters "$T_2$" and "$T_3$".

Figure 11E:
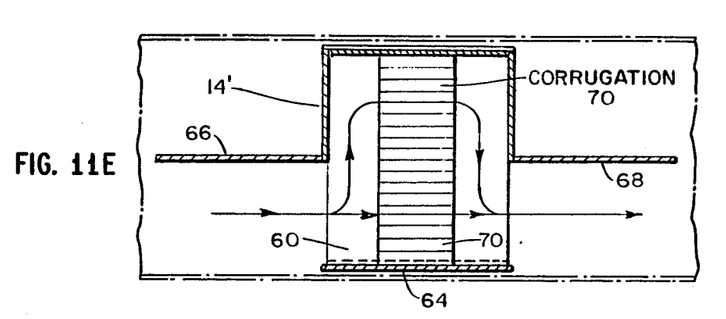
Figure 11F:
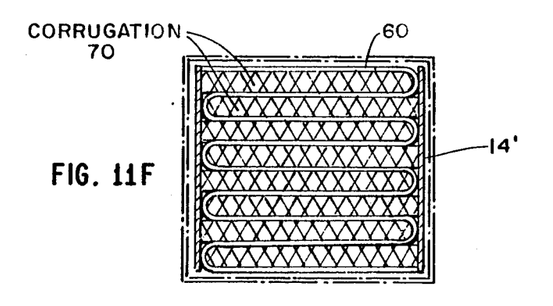

Sheet 5, Fig. 11E, reverse the direction of the six flow-direction arrows.

Figure 14A:
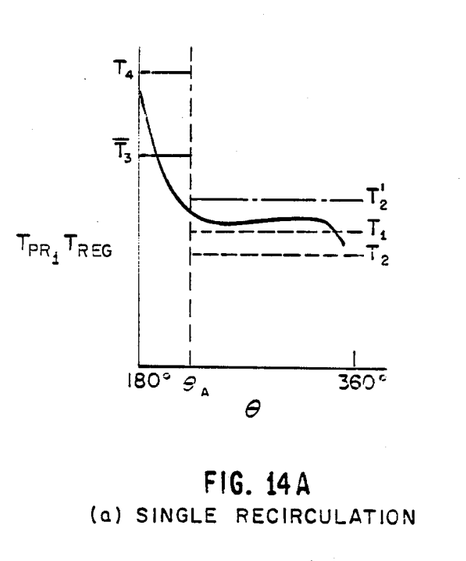
FIGS. 14A and 15A are graphs of temperatures versus angle in the corresponding embodiments of FIGS. 14 and 15, respectively.

Sheet 7, Fig. 14A, change the reference character "$T_{PR_1}T_{REG}$" to --$T_{PR'}T_{REG}$--.

Figure 15A:
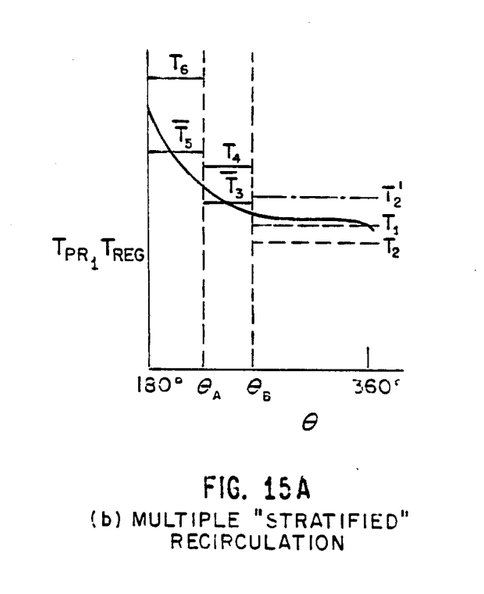

Sheet 7, Fig. 15A, change the reference character "$T_{PR_1}T_{REG}$" to --$T_{PR'}T_{REG}$--.

Signed and Sealed this

Twenty-first Day of February, 1989

Attest:

DONALD J. QUIGG

Attesting Officer     Commissioner of Patents and Trademarks